(12) United States Patent
Pachet et al.

(10) Patent No.: US 8,566,258 B2
(45) Date of Patent: Oct. 22, 2013

(54) MARKOVIAN-SEQUENCE GENERATOR AND NEW METHODS OF GENERATING MARKOVIAN SEQUENCES

(75) Inventors: François Pachet, Paris (FR); Pierre Roy, Paris (FR)

(73) Assignee: Sony Corporation, Tokyo (JP)

(*) Notice: Subject to any disclaimer, the term of this patent is extended or adjusted under 35 U.S.C. 154(b) by 515 days.

(21) Appl. No.: 12/834,638

(22) Filed: Jul. 12, 2010

(65) Prior Publication Data
US 2011/0010321 A1    Jan. 13, 2011

(30) Foreign Application Priority Data
Jul. 10, 2009 (EP) .................................. 09305673

(51) Int. Cl.
*G06F 15/18*    (2006.01)

(52) U.S. Cl.
USPC ............................................................ 706/12

(58) Field of Classification Search
None
See application file for complete search history.

(56) References Cited

U.S. PATENT DOCUMENTS

| 2005/0209959 A1* | 9/2005 | Tenney ............................ 705/39 |
| 2008/0114564 A1* | 5/2008 | Ihara .............................. 702/158 |
| 2008/0208783 A1* | 8/2008 | Jaros et al. ...................... 706/21 |

FOREIGN PATENT DOCUMENTS

EP    1274069 A2    1/2003

OTHER PUBLICATIONS

Liu and Papaefthymiou, "A Markov Chain Sequence Generator for Power Macromodeling", IEEE Transactions on Computer-Aided Design of Integrated Circuits and Systems, vol. 23, No. 7, Jul. 2004, pp. 1048-1062.*

Durey, Clements, "Melody Spotting Using Hidden Markov Models", Proceedings of 2nd Annual International Symposium on Music Information Retrieval 2001, ISMIR 2001, Oct. 2001, pp. 109-117.*
Biyikoglu, "A Markov Model for Chorale Harmonization", Proceedings fo the 5th Triennial ESCOM Conference, Sep. 2003, pp. 81-84.*
Cont, "Modeling Musical Anticipation: from the time of music to the music of time", UC San Diego Phd Doctoral Dissertation, "http://esscholarship.org/uc/item/4nv162ms", Jan. 2008, pp. 1-315.*
A Framework for Object-Oriented Constraint Satisfaction Problems by P. Roy, A. Liret, and F. Pachet, from "Implementing Application Frameworks: Object-Oriented Frameworks at Work" Fayad, M. and Schmidt, D. and Johnson, R., editors, pp. 369-402, John Wiley & Sons (1997).

* cited by examiner

*Primary Examiner* — Kakali Chaki
*Assistant Examiner* — Walter Hanchak
(74) *Attorney, Agent, or Firm* — Oblon, Spivak, McClelland, Maier & Neustadt, L.L.P.

(57) ABSTRACT

A new type of Markovian sequence generator and generation method generates a Markovian sequence having controllable properties, notably properties that satisfy at least one control criterion which is a computable requirement holding on items in the sequence. The Markovian sequence is generated chunkwise, each chunk containing a plurality of items in the sequence. During generation of each chunk a search is performed in the space of Markovian sequences to find a chunk-sized series of items which enables the control criterion to be satisfied. The search can be performed using a generate and test approach in which chunk-sized Markovian sequences are generated then tested for compliance with the requirement(s) of the control criteria. Alternatively, the search can be performed by formulating the sequence-generation task as a constraint satisfaction problem, with one or more constraints ensuring that the generated sequence is Markovian and one or more constraints enforcing the requirement(s) of the control criteria. The sequence generator can be used in an interactive system where a user specifies the control criterion via an inputting device (20).

10 Claims, 4 Drawing Sheets

FIG.4
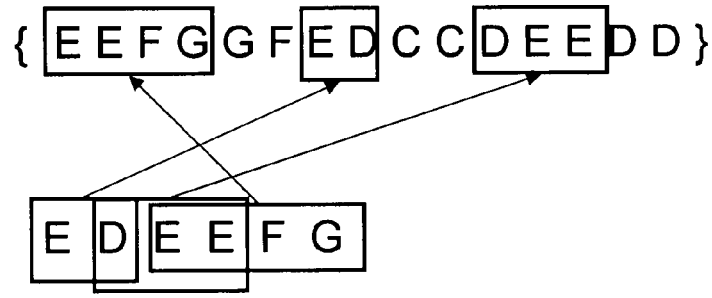
FIG.5
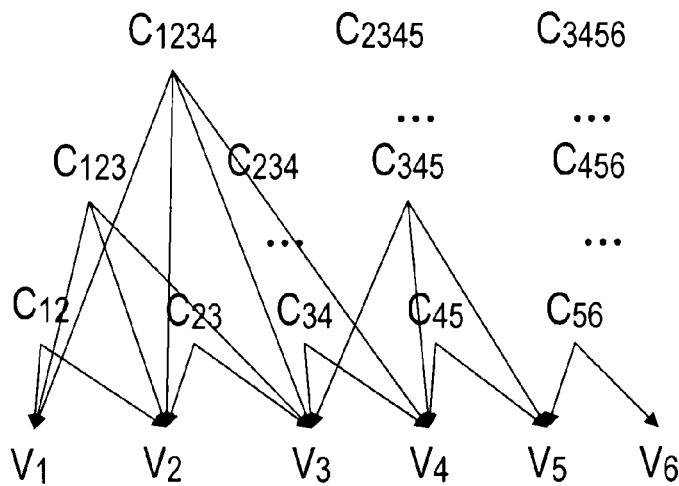
FIG.6
```
                         (with a little help)
C E        -->  E F G G F E D E F F E F E D D D C E
                         (arpeggio)
  E G F    -->  C E C E G F D C
                         (with a little help)
    F E D E  -->  E F G G F E D E F F E F E D D D C E
                         (arpeggio)
      E C E G F D  -->  C E C E G F D C
                                 (arpeggio)
        C E C E G F D C  -->  C E C E G F D C
```
C E G F E D E C E G F D C E C E G F D C
Additional constraints

MARKOVIAN-SEQUENCE GENERATOR AND NEW METHODS OF GENERATING MARKOVIAN SEQUENCES

CROSS-REFERENCE TO RELATED APPLICATIONS

This application claims the benefit of priority under 35 U.S.C. §119 from European Patent Application No. 09305673.7, filed Jul. 10, 2009, the entire contents of which is incorporated herein by reference.

BACKGROUND OF THE INVENTION

The present invention relates to the field of Markovian-sequence generation, that is, to methods and devices which generate sequences containing at least a portion having the Markov property. More particularly, the invention relates to a new type of Markovian-sequence generator and generation method with the ability to generate sequences including Markovian sequence portions whose properties are controllable.

There are many applications in which Markovian-sequence generators are used to generate sequences: often these applications seek to generate a Markovian sequence that will model a process (e.g. modelling a sequence of outcomes that could arise in a game of chance, modelling a process occurring in the natural world, etc.), other applications aim to compose a new work—for example a new melody, a new text work, etc.—notably, for the entertainment of the user. In the latter type of application it is often desirable for the composition process to be interactive, at least to a limited degree.

It is helpful to recall some basic features relating to Markovian sequences. A Markovian sequence (or Markov chain) is a sequence of items in which the items at locations early on in the sequence have no effect on the items at locations further on in the sequence. In a Markovian sequence of order 1, the next item in the sequence depends only on the item before it and on a set of probabilities that define the respective probabilities of transitions from one item to another. Each item in the sequence can be considered to represent a "system state" and the probability distribution defines the probability of transitions from one system state to another. For example, in the game of snakes and ladders, the sequence of squares landed on by a player's playing piece is a Markovian sequence of order 1. At each turn, the next square in the sequence is determined solely by the current square and the probabilities of different throws of a die The "order" of a Markovian-sequence determines how many preceding items in a sequence are taken into account when the next item in the sequence is generated. For example, consider a Markovian-sequence generator which, so far, has produced a sequence of letters of the alphabet ABCEDDEG. When deciding the next letter of the sequence, a Markovian-sequence generator of order 1 would consider only the final item in the sequence (i.e. "G"), a Markovian-sequence generator of order 2 would consider the last two items in the sequence (i.e. the sub-sequence "EG"), a Markovian-sequence generator of order 3 would consider the last three items in the sequence (i.e. the sub-sequence "DEG"), and so on. For ease of description, the term "preamble" shall be used here to describe the item or sub-sequence that is taken into account by a Markovian-sequence generator when deciding what item to put next in a sequence. Thus, in the above example, preambles "G", "EG" and "DEG" are used by the Markov generators of orders 1, 2 and 3, respectively. In each case, the Markovian-sequence generator determines the next item in the sequence by a random draw from among the possible candidate items that could, in theory, come next, taking into account the respective probability of each candidate item following on from the preamble in question.

The domain of items that can form part of the sequence, and the probabilities of transitions from one item to another, depend on the application in which the Markovian-sequence generator is being used. Usually, the domain of candidate items is substantially constant irrespective of the location within the sequence for which an item is being selected. Moreover, the items in the domain may be elements of different types, and/or elements of the same general type but having different properties: for example, in a case where the sequence to be generated will be a sequence of musical notes, the items in the domain can be notes having different pitches, durations, different rhythmic properties, different amplitudes, etc. and any combination thereof (i.e. different viewpoints).

In some cases the probabilities of transitions from one item to the next in the sequence are determined by explicit rules: for example, in the case where a Markovian sequence models the sequence of squares occupied by a playing piece during a game of snakes and ladders, the probability of a transition from a given square to a particular other square depends on the probability that a throw of a die will displace the playing piece onto that other square. However, in numerous applications, especially applications where a Markovian-sequence generator is intended to compose a new work automatically, the allowed transitions and their associated probabilities are usually derived from a training database which contains sequences or sub-sequences corresponding to the whole or parts of works of the type to be generated. In such a case, the Markovian-sequence generator is configured so that it applies transition probabilities only in respect of transitions that have already occurred in the sequences/sub-sequences in the training database.

Markov-chain text generators are often used to produce parodies of an input text (e.g. a parody of an input poem in the style of a particular poet). In such a case it is desirable for the output sequence to follow syntactical rules that are followed in the language of the text as well as mimicking stylistic tendencies of this particular input text. This is achieved by an analysis of the input text and control of the Markov-chain generator such that the probability of a given word-to-word transition in the generated text can be based on the probability of this same word-to-word transition in the input text. In a similar way, when it is desired to generate a melody in the style of a particular composer, musical phrases composed by that composer can be used as a training database for a Markovian-sequence generator, the note-to-note transitions in the generated melody being derived using a random draw based on the probability of the corresponding note-to-note transitions in the training database.

Conventional Markovian-sequence generators work on an incremental basis to build up a sequence item by item, using a random draw approach as described above. This is a "low-cost" approach, that is, one which allows the output sequence to be generated with little computational overhead. However, conventional Markovian-sequence generators do not allow the user to control the properties of the Markovian sequences that are produced.

European patent application EP 1,274,069 describes an automatic music-composition system, called the Continuator, which uses a Markovian-sequence generator to generate a sequence of musical notes or chords that is a continuation of a melody that is input to the system (e.g. by a user playing a musical instrument). The system seeks to generate a sequence which is a realistic-sounding continuation of a melody begun by the user and which mimics the stylistic characteristics of a training corpus. The Markovian-sequence generator used in the Continuator is a variable-order, Markovian-sequence generator which, when selecting the next note/chord to generate, compares the terminal portion of the melody so far (including the sequence played by the user and the continuation generated so far) with sequences present in the training corpus, looking for the longest sequence in the training corpus that matches with the terminal portion of the melody so far and selecting, as the next note/chord in the continuation, one which follows on from this longest sequence. This process is then iterated by considering the new sequence formed by the previous input sequence, concatenated to the items thus chosen (variable-length random walk approach)

The Continuator allows the user to launch the generation of a melody "in a particular direction", for example in terms of the harmonic nature or velocity of the notes in the sequence, by inputting a short sequence of notes that is used to bias the choice of the next item to be included in the continuation. However, even in this system the user can exercise only very limited control over the sequence that is generated, in particular, the user's input affects only one item in the continuation (sequence) namely the item adjacent to the portion of the sequence that has already been generated.

BRIEF SUMMARY OF THE INVENTION

The preferred embodiments of the present invention provide a Markovian-sequence generator and a Markovian-sequence generation method which enable a user to exercise much more extensive control over the properties of the output Markovian sequence. Some sequence generators and generation methods embodying the present invention may be configured to generate sequences which are substantially Markovian throughout; others may be configured to generate and output mixed sequences which have Markovian and non-Markovian portions; yet others may be configured so as to be able to switch between production of fully-Markovian, non-Markovian and mixed sequences.

The present invention exploits the probabilistic nature of the transitions between adjacent items in a Markovian sequence and, in particular, the fact that there are multiple different possible Markovian sequences that could be generated in a given Markovian-sequence-generation task (for a given set of domains for the items in the sequence, a given set of allowable transitions and associated probabilities). In general, these different possible Markovian sequences will have different properties. Accordingly, when a user wishes to obtain a Markovian sequence having particular properties, Markov-chain generators according to the present invention perform a search amongst various possible Markovian sequences in order to find one (or more) which match the user's selection criterion (or criteria). Formally, it can be said that Markov-chain generators according to the present invention search the space of possible Markovian sequences in order to locate one or more sequences which satisfy the user's criterion/criteria.

The present invention represents a paradigm shift, away from the incremental, item-by-item generation of Markovian sequences that is implemented in conventional Markov-chain generators, to a new approach where a Markov-chain generator searches the space containing all theoretically-possible Markovian sequences, taking into account the properties of the items at multiple locations within these theoretically-possible sequences, notably at "forward locations" relating to positions in the sequence that are subsequent to the item which is being selected to go next in the sequence (i.e. the properties of items that are not in or adjacent to the portion of the sequence that has already been generated). This new approach is more "costly", i.e. computationally intensive, than the conventional approach. However, it has a kind of look-ahead capability which enables controllable Markovian sequences to be generated in accordance with selected control criteria. Moreover, the preferred embodiments of the invention employ techniques which reduce the computational overhead involved in performing the search.

The present invention provides a Markovian-sequence generator as specified in claim 1 appended to the present description.

The present invention provides an interactive Markov-sequence generating system as specified in claim 8 appended to the present description.

The present invention provides a Markovian-sequence generation method as specified in claim 10 appended to the present description.

In the preferred embodiments of the invention, a series of items is selected for a series of adjacent locations in the Markovian sequence—in other words, the sequence is generated chunkwise—and these chunks are assembled to form the output Markovian sequence. During the selection of the items in a chunk, the Markovian-sequence generators according to the preferred embodiments of the invention analyse different possible series of items which correspond to Markovian sequences and, theoretically, could be included at this set of adjacent locations in the overall sequence and select a series of items which enables a set of one or more control criteria to be satisfied.

This approach can cater for a wide variety of control criteria, including control criteria which place constraints on the properties of items at multiple locations in the sequence or at "future locations", i.e. locations subsequent in the series to the location being considered. It should be understood that the term "future" here is not intended to limit the invention to the case where the sequence being generated represents items that are sequential in time. The Markov-chain generators according to the invention can be configured to generate sequences of different types, including, but not limited to temporal sequences, for example, also including spatial sequences (including sequences in multiple spatial dimensions), and spatio-temporal sequences (including video).

In general, the items in a sequence will be describable in terms of features, each feature consisting of a given attribute and an associated value for that attribute. These attributes may take numerical values but this is not essential: attributes may take values that are not numerical, for example: the values "true" or "false" (indicating whether the attribute is or is not possessed by the item in question), "values" which correspond to a property selected in a set (e.g. values "red", "green", "blue" and so on for an attribute "colour"), etc.

The preferred embodiments of the present invention provide a Markovian-sequence generator and generation method which can generate a sequence (that includes at least one Markov chain portion) so that the sequence satisfies a set of one or more control criteria each of which defines a computable requirement holding on the sequence. This computable requirement can be a Boolean proposition relating to features of items at different locations in the sequence.

More especially, when generating the next part of a sequence, the Markovian-sequence generators and generation methods according to the invention can select the next item so that a control criterion can be satisfied even though it holds on an item that is not adjacent to the part of the sequence that has been generated so far.

Thus, for example, Markovian-sequence generators and generation methods according to the invention may allow a user to specify a control criterion of the type "the tenth item in the sequence must be the same colour as the fourth item" and, at the time when the fourth item in the sequence is being selected, the impact of this selection on the properties of the item at the tenth location is taken into account.

BRIEF DESCRIPTION OF THE SEVERAL VIEWS OF THE DRAWINGS

Further features and advantages of the present invention will become apparent from a reading of the subsequent description of preferred embodiments thereof, given by way of example and not limitation, with reference to the accompanying drawings, in which:

FIG. 4 is a diagram illustrating how a variable-order Markov sequence may be constructed by tiling of various "orders" using sub-sequences corresponding to portions of training sequences in a training database;

FIG. 5 is a diagram illustrating a configuration of Markov constraints that can be defined so as to ensure that a sequence generated according to the second preferred embodiment of the invention corresponds to a variable order Markovian sequence;

FIG. 6 is a diagram illustrating a sequence generated in an experiment that sought to generate, using the second preferred embodiment of the invention, a variable-order Markovian sequence that matched various control criteria.

DETAILED DESCRIPTION OF THE INVENTION

Figure 1:
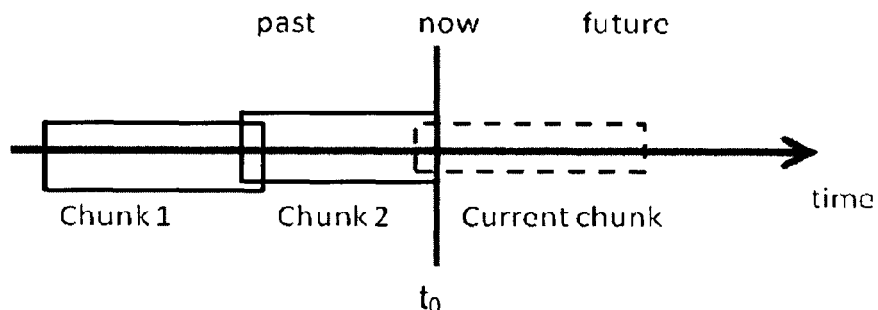
FIG. 1 illustrates the chunk-wise generation of a controllable Markovian sequence according to preferred embodiments of the present invention.

Before discussing in detail first and second preferred embodiments of Markovian-sequence generation methods according to the present invention, some general comments will be made that are applicable to both of these preferred embodiments of the invention.

The Markovian-sequence generators and generation methods according to the present invention are of general application, in other words they may be configured to generate sequences of items of substantially any desired type. The Markovian-sequence generators and generation methods according to the present invention may be configured to output a description of the generated sequence, notably data that describes or identifies the items of the generated sequence and their ordering within the sequence, for example in the form of an ordered list, table or other symbolic representation (and this description may be stored, printed, displayed, transmitted over a network or output in some other way). However, there are many applications in which it is advantageous alternatively, or additionally, to render the generated sequence in a form that is perceptible to the user. This will typically be the case when the invention is applied to a system which composes music, text, still image data, video, or other content that is susceptible of a digital representation.

When the Markovian-sequence generators and generation methods of the present invention are configured to render the generated sequence in a form that is perceptible to the user, the rendering device and method should be appropriate to the nature of the items in the sequence. For example, when the generated sequence is a musical composition, the generated sequence may be output by using a loudspeaker to play an audio signal corresponding to the musical composition; when the generated sequence is a text, the generated sequence may be output by displaying the text on a monitor, by printing out the text, by using a loudspeaker to output a spoken version of the text, etc.; when the generated sequence is a sequence of colours, the generated sequence may be output by illuminating lights of the appropriate colours in an order corresponding to the generated sequence, by displaying the colours on a monitor ordered in the appropriate way in time or space, etc.; and so on.

It will be understood that, in applications where the Markovian-sequence generators and generation methods of the present invention render the generated sequence data, the system produces a physical entity (an audio signal, a displayed image, a light show, etc.) whose properties are controlled according to the specified control criterion/criteria.

As mentioned above, the invention represents a new paradigm in which Markovian sequences having controlled properties are generated by searching the space of Markovian sequences for a suitable sequence that matches the control criterion/criteria. This could be considered to be a type of combinatorial optimization. However, the typical applications of combinatorial optimization (e.g. for scheduling, rostering, etc.) generally require complete (possibly very long) sequences to be produced. By way of contrast, the preferred embodiments of the invention "slice" the overall sequence to be generated into consecutive chunks and apply search techniques to find a suitable Markovian sequence for a given chunk. Once the chunk is computed, it is added to the rest of the sequence generated so far, and the next chunk is then considered As mentioned above, the sequence-generators according to the present invention are Markovian sequence generators. Consequently, for those portions of the sequence that are desired to be Markovian, embodiments of the invention are configured to seek to ensure that Markovian continuity is maintained both between two consecutive chunks and during the generation of each chunk.

This chunk-based approach is particularly well suited to applications where the preferred embodiments of the invention are used for interactive sequence generation, for example as part of an interactive design or composition system, or a game. In this context, a sequence must be generated according to some input control parameter(s) derived from user behaviour (e.g. through input devices, controllers, sensors, etc.), typically in real-time. In interactive applications of this type, once a chunk has been computed it is usually appropriate to "deliver" the chunk to the user (e.g. to render/play the chunk to the user), so that the user can base further control input on his appreciation of the sequence generated so far. By definition, chunks which have already been delivered in this way cannot be changed.

FIG. 1 illustrates the output of a chunkwise sequence-generator over time. At time $t_0$ in FIG. 1, Chunk 3 of the sequence is being computed (designated the "current chunk"), whereas Chunks 1 and 2 have already been computed and will not, now, be changed.

The appropriate size of chunk to be generated by the chunkwise sequence generators used in the present invention depends on the application. However, some general remarks can be made.

Firstly, in certain applications the chunk size can be variable, that is, the sequence generator can be configured to generate the overall sequence by generating and linking up sequence-chunks of different sizes. Moreover, the chunk size may be set according to fixed or dynamic rules. For instance, in one example of a melody-generation application, the system may be configured so that a background audio accompaniment is played (in synchronization) at the same time as the melody is being generated. Some passages in the accompaniment may have particular properties, for example in terms of tempo (slow, fast, etc.), and the system may be configured to set chunk size based on these particular properties of the accompaniment. Such properties may be determined manually and input as a control to the system, or may be determined in an automatic analysis process performed beforehand (or in real-time, if the audio output corresponding to the accompaniment is subjected to a time delay to compensate for the time needed to generate the corresponding chunk of melody). As another example within this particular melody-generation application, a harmonic analysis may be performed of the audio accompaniment, and the chunks size may be determined based on the harmony (i.e. if a chord lasts 2 measures, the chunk will extend over 2 measures, etc.)

In general, if the chunk size is large then the number of possible Markovian sequences that need to be searched will be correspondingly large, increasing the time and computing power required for performing the search. This reduces the responsiveness of the system and may lead to an inability to generate the desired overall Markovian sequence in real-time (which is a disadvantage for interactive applications), or at all. If the chunk is small then it is relatively quick and easy to compute, but the user has more restricted control over the properties of the generated Markovian sequence.

Chunk size may also be determined by an analysis of user actions themselves. For instance, in the case where control criteria are produced based on user gestures, it can be decided that "slow" gestures would imply largest chunks (e.g a slow, ascending movement of the arm would trigger a longer chunk for the melody to be generated).

Using the present invention, substantially any property of a Markovian sequence that can be expressed as a computable requirement holding on (any number of) items in the sequence can be controlled, subject to the use of a chunk of appropriate size. This computable requirement could be a relationship between parameters that have numerical values (e.g. a relationship specifying that a first numerical value applicable to a given item in the sequence is greater than, less than, or equal to a second numerical value that is applicable to some other item or sub-sequence in the overall sequence, or to the sequence as a whole) but the invention is not limited to this; other types of computable requirement can be accommodated, notably Boolean propositions (e.g. "the fourth item in the sequence must be more red than the first item in the sequence", "the sequence must become increasingly jazzy"). More generally, the control criteria can be computable requirements that can be expressed as arithmetical properties (involving basic mathematical operators such as +,*, etc.), as well as so-called "cardinality" properties (involving the number of items having a specific property, e.g. "no more 4 notes should be the same").

Usually, standard computing techniques will be suitable for determining whether or not a given sequence of items satisfies a requirement imposed by a control criterion. However, in some cases (notably, where attributes have values that are subjective), it may be necessary to make use of a classifier in order to determine whether or not a given attribute value applies to a particular item in the sequence or to some sub-sequence within the overall sequence.

The Markovian-sequence generation methods of the present invention may be applied in systems where the control of the properties of the Markovian sequence is automatic, i.e. exercised by the system itself without explicit input of specific sequence-control criteria by a user (the system may be pre-programmed with objectives to be achieved by controlling the generated sequences, or general rules regarding circumstances in which different types of control should be realized). Alternatively, Markovian-sequence generation systems according to the invention may be configured to implement control according to one or more control criteria that are input by a user ahead of time. Hybrid semi-automatic systems may also be produced.

Moreover, using the invention it becomes possible to construct new kinds of interactive Markovian-sequence-generation systems that enable a user to interact with the sequence-generator so as to exert extensive control over a generated Markovian sequence in real-time. This interactive control may be exercised in a variety of different contexts: in the context of playing a game, or in composing music, text or other content that is susceptible of a digital representation, or in designing a graphic or other visually-represented sequence, and in many more contexts of different natures.

In interactive systems of this type, the generated sequence will typically be rendered back to the user in real-time so that the user can update the control criteria, if he so desires, thus shaping the generated sequence in an ongoing, interactive manner somewhat similar to a conductor conducting an orchestra or a driver controlling the course of a car.

Figure 2:
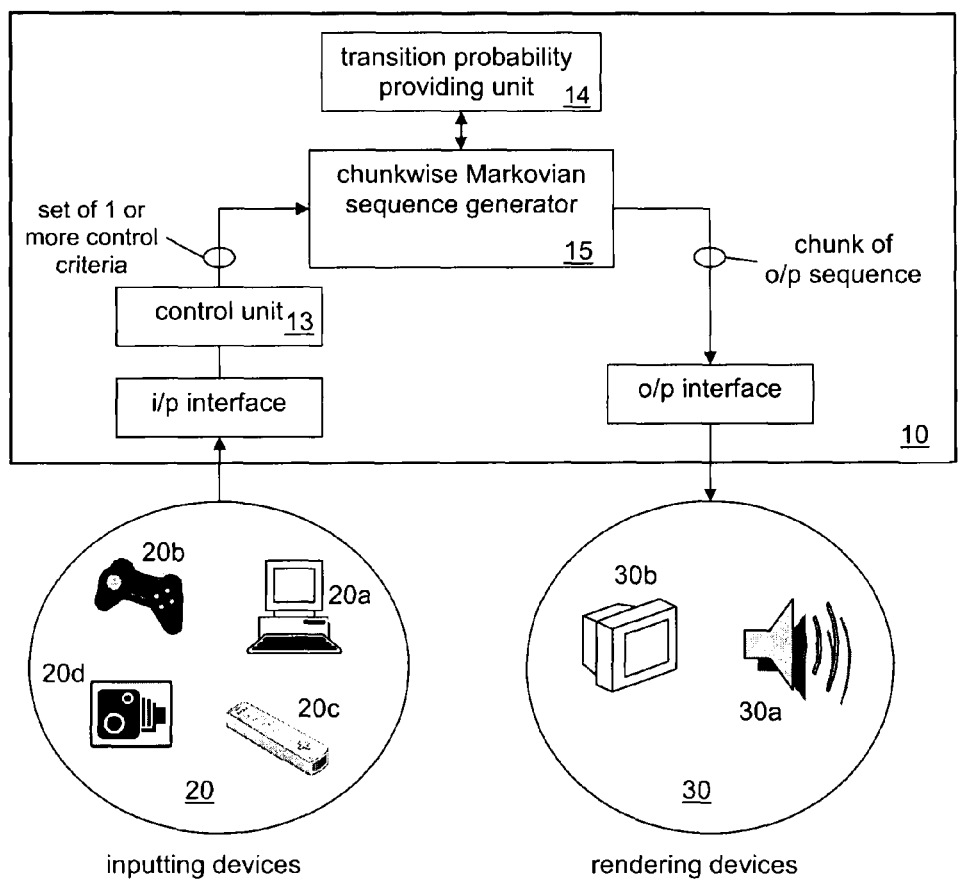
FIG. 2 is a block diagram showing components in an interactive sequence-generation system which can apply Markovian-sequence generation methods according to the present invention.

FIG. 2 illustrates the general architecture of an interactive sequence-generation system in which the Markovian-sequence generation methods of the present invention may be implemented. This interactive Markovian-sequence-generation system may be applied in a wide variety of different applications, for example, it could be a system for automatic composition of music, text or other content that is susceptible of a digital representation, for synthesis of still images or video, in games, and many other applications.

As illustrated in FIG. 2, an interactive sequence-generation system 10 according to embodiments of the present invention is configured to receive control input from a user in real-time via any convenient kind of inputting device 20 including, but not limited to: a keyboard, mouse, graphics tablet, touch screen or other device 20a that a user operates in order to interact with a user interface (for example a graphical user interface) configured to allow the user to specify control criteria for the sequence to be generated; a conventional game controller 20b comprising user-operable buttons, levers and the like; a controller 20c (such as Nintendo's wiimote) which uses accelerometers and the like to detect gestures made by a user; an image capture and analysis system 20d configured to detect and interpret user gestures; etc. In addition, controllers and sensors other than those specifically mentioned here may be configured to allow a user to specify the control criteria describing the desired properties of the sequence to be generated.

It will be understood that, especially when an interactive sequence-generation system of the kind illustrated in FIG. 2 is configured to accept control input based on a user's behaviour or gestures, the user is able to exert control over the generated sequence in an intuitive and playful manner.

The interactive sequence-generation system 10 will typically include an input interface which receives the user's control input. This control input is interpreted by a control unit 13 which outputs a set of one or more control criteria that are to be met by the generated sequence. The interactive sequence-generation system 10 includes a chunkwise Markovian sequence generator 15 which uses techniques, such as those described below with reference to the first and second preferred embodiments of the invention, to generate chunks of the desired Markovian sequence. The probabilities of particular transitions within the sequences are governed by probabilities and a unit 14 supplies the Markovian sequence generator 15 with data it uses to apply transition probabilities appropriate to the application in question. The generated chunks of the Markovian sequence are output via an output interface and, as mentioned above, will typically be rendered by a rendering device 30 appropriate to the nature of the items in the sequence, which may be a loudspeaker 30a, a monitor or other display device 30b, etc.

The architecture illustrated in FIG. 2 includes only a sequence-generation component adapted to produce Markovian sequence portions. However it will be understood that one or more other sequence-generation components may be used in parallel with the chunkwise Markovian sequence generator 15, in a system where it is desired to output a sequence having at least one non-Markovian portion.

Markovian-sequence generation methods according to a first and second preferred embodiment of the invention will now be described. These methods can be applied by the chunkwise Markovian-sequence generator 15 used in the interactive system illustrated in FIG. 2, as well as in other architectures (including fully-automatic Markovian-sequence-generation systems, systems which receive the user's control input ahead of time (i.e. not in real time), hybrid systems, etc.).

A first preferred embodiment of the invention ensures both Markov continuity within each chunk (intra-chunk continuity) and satisfaction of the input control criterion (or criteria) by using a "generate and test" approach, i.e. generating a certain number of candidate Markovian sequence chunks at random and then selecting the one which best satisfies the input control criterion or criteria. In order to ensure inter-chunk continuity, each sequence is generated as a continuation of the preceding chunk using the random walk approach.

The "generate and test" approach applied in the first preferred embodiment of the invention has been applied with considerable success in Markovian-sequence generators according to the invention which automatically generate musical melodies, notably melodies which mimic jazz improvisations. A jazz-melody composing system of this type will be described below as an example of one possible implementation of the first preferred embodiment of the invention. It is to be understood that the first preferred embodiment of the invention can be implemented in numerous different ways in music-composing systems and in a wide variety of other applications that already exist or could be developed, including but not limited to: music games involving one or several players (e.g. playing in turn), musical pedagogy applications, image drawing applications, computer-aided design systems, and combinatorial games in which the user must produce sequences of items optimizing Markovian (i.e. tiling) properties satisfying various arbitrary constraints.

Figure 3:
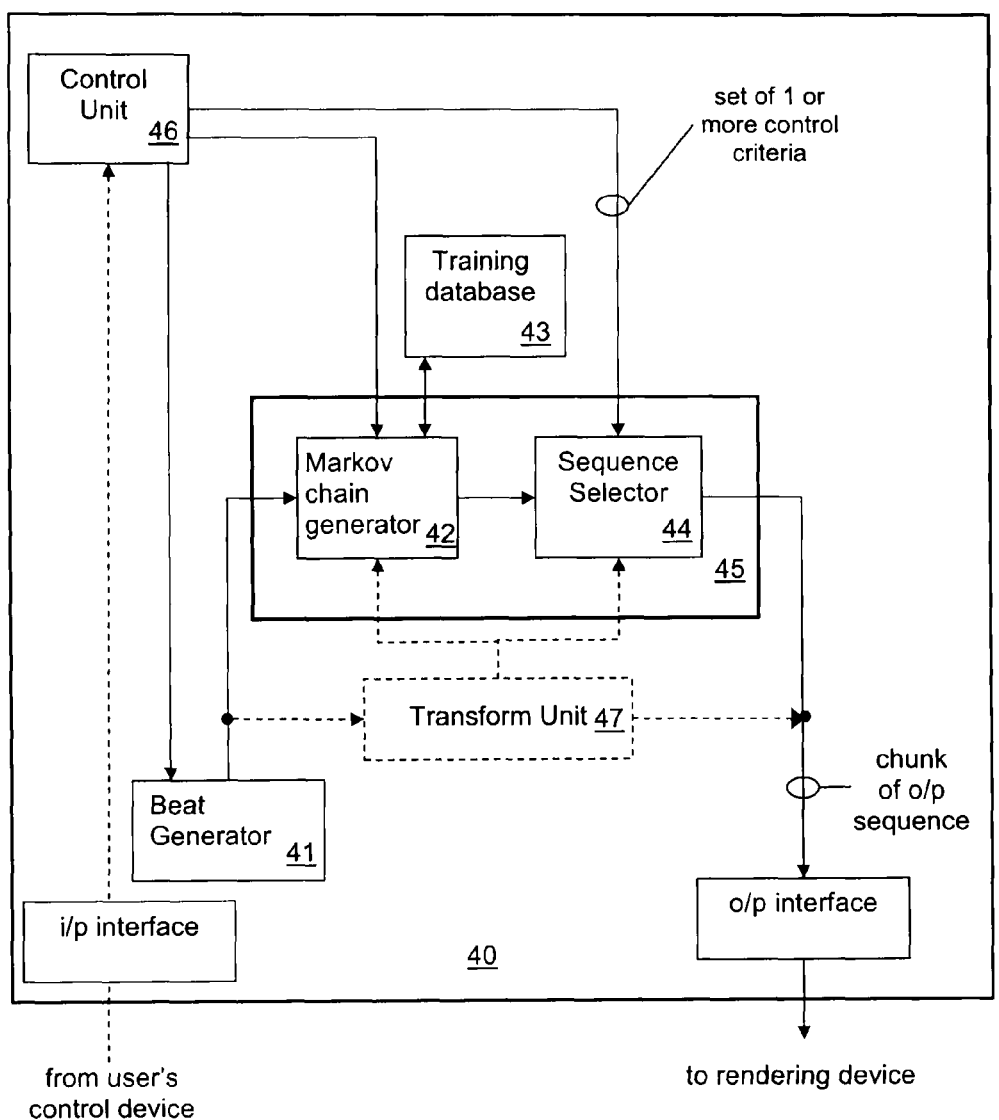
FIG. 3 is a block diagram showing components in a jazz-melody composing system as an example of an application of the first preferred embodiment of the invention.

The general architecture of this particular example of jazz-melody composing system, implementing a Markovian-sequence generation method according to the first preferred embodiment of the invention, is illustrated in FIG. 3.

The automatic jazz-melody composition system 40 of FIG. 3. is configured to generate a jazz melody that corresponds to a Markovian sequence of monophonic musical notes (pitches). The automatic jazz-melody composition system 40 includes a chunkwise Markovian sequence generator 45 configured to output the desired melody in chunks of multiple notes at a time. The generated sequence is output via an output interface, preferably to a rendering device (e.g. a loudspeaker) which can playback an audio signal representing the automatically-generated jazz harmony.

The chunkwise sequence generator 45 includes a Markov-chain generator unit 42 which is configured to generate multiple different possible candidate sequences of notes that could be selected as the output sequence-chunk. The chunkwise sequence generator also includes a sequence selector 44 for selecting one of the different candidate sequences generated by the Markov-chain generator unit 42 to serve as the sequence-chunk that is output to form part of the overall sequence generated by the system. The sequence selector 44 is configured to select the candidate sequence that best matches a set of one or more control criteria. The set of control criteria can include computable requirements that hold on items that are not adjacent to the portion of the overall sequence that has already been generated.

The number of notes in each chunk varies but, in this example, each chunk corresponds to one musical beat. More particularly, in the example system of FIG. 3, a control unit 46 controls a beat generator 41 so that, for each beat of the melody, the beat generator 41 decides whether the melody will be made up of four quarter notes, eight eighth notes, sixteen sixteenth notes, or will be made up of triplets of quarter notes, eighth notes or sixteenth notes. This sets the number of notes that will be included in the chunk that the chunkwise sequence generator 45 will generate for this beat of the melody. The beat generator 41 sends a signal to Markov-chain generator unit 42 in the chunkwise sequence generator 45, identifying the number and category (quarter note, etc.) of notes to be generated for the "next chunk".

It has been found to be advantageous to keep the rhythm substantially constant within one beat (i.e. for the beat generator 41 to select a set of notes of the same duration for generation within a given beat), because this closely models what tends to occur naturally in a jazz improvisation played by a human virtuoso musician. Moreover, the configuring of the beat generator 41 so as to select notes of relatively short duration (quarter notes or less) also results in a generated sequence which resembles a jazz improvisation.

As indicated above, the Markov chain generator unit 42 is arranged to produce multiple different Markovian sequences that could, in theory, be used as the sequence-chunk to be output for the current beat. The Markov chain generator unit 42 produces each candidate sequence note by note, taking into account the probability of a transition from a given note to another as represented in a training database 43 which stores training sequences (sample melodies) having stylistic qualities that the automatically-generated melody is intended to mimic. The Markov chain generator unit 42 can be a fixed order or variable order device. The control unit 46 controls the Markov chain generator unit 42 so that it produces a specified number of candidate Markovian sequences.

The sequence selector 44 will select one of the candidate Markovian sequences for output by determining which of the candidate sequences best matches a set of control criteria identified by the control unit 46. This set of control criteria can be input to the system in advance in any convenient way (via an input interface, by pre-programming of the system, etc.). Alternatively, the set of control criteria can be input in real-time from an inputting device that is responsive to user action.

In this application it is possible to let the user control the generated melody in terms of high-level properties that are meaningful to a musician. More particularly, this system allows the user to specify some arbitrary kind of criterion which defines target properties of the next phrase of the melody in terms of phrase features such as pitch (e.g. "make the average pitch of the next phrase higher/lower than the preceding one(s)"), harmonic constraints ("more tonal notes"), intervals ("chromatic"), direction ("ascending", "descending"), arpeggiosity, etc. this allows the user to control the generated melody so that it has desired musical properties.

In the example of FIG. 3, the sequence selector 44 is configured to compute a set of scalar features (attributes and associated values) that describe each successive sequence-chunk. The computed values are held in a temporary storage unit or memory (not shown). When it is time to generate the next chunk in the sequence, and the user has specified a control requirement that defines an attribute of the next musical phrase relative to the preceding one(s), the sequence selector 44 computes the feature(s) of the different candidate sequences output by the Markov chain generator unit 42 for the next chunk, and determines which of these candidate sequences has feature values that best satisfy the control requirement.

For example, in a very simple case the sequence selector 44 may compute the following features of the candidate sequences output by the Markov chain generator unit 42: the mean pitch of the sequence, the mean interval within the sequence and the tonalness of the sequence (tonalness takes a value in the range [0,1] and can be computed using a pitch profile algorithm such as that of Krumhasi). If the user wishes to make the sequence become more tonal, he inputs a control input to that effect and the sequence selector 44 selects for output a candidate Markov sequence that is more tonal than the preceding portion of the overall generated sequence. The sequence selector 44 may include a memory or register (not shown) allowing it to hold, temporarily, the values of the scalar features that were computed for previously-output chunks of the generated melody It can be desirable to configure the system to place certain additional musically-relevant constraints on the melodies that can be generated by the sequence generator 40. Notably, it can be desirable for the generated melody to have a certain degree of continuity and to follow a coherent harmonic structure (a sequence of chords). Melodies respecting such additional constraints tend to better mimic jazz improvisations produced by human musicians.

These additional constraints can be built into the system so that they do not need to be the subject of explicit user control. For example, in order to ensure that a generated melody has a harmonic structure that follows a given series of chords it can be advantageous to configure the training database so that it includes multiple different sets of training sequences, each set of training sequences corresponding to notes compatible with a given chord. The control unit can then be configured such that when the Markov chain generator 42 needs to generate candidate Markov sequences for a given beat of the melody, the control unit 41 determines what chord of the chord sequence is applicable during that beat, and controls the Markov chain generator so that it generates candidate Markov sequence using a set of training sequences that is compatible with the determined chord.

Furthermore, if the system is configured so as to attempt to maintain continuity of the generated melody even across transitions from one chord to the next, cases can arise when no suitable "next note" (i.e. no note that is provides a sense of musical continuity) can be found in the training sequences that the Markov chain generator 42 is using. In such a case the Markov chain generator unit 42 of the system 40 of FIG. 3 is configured to determine which notes are one semi-tone above or below the last note in the sequence generated so far, and to test which of these two notes provides musical continuity. This repair mechanism is motivated by the realisation that, in jazz, each note is at most only one note away from a pitch which represents a naturalistic continuation of the harmonic structure of the melody (referred to as the "one note max" theorem).

It has been found that the naturalism of the melodies produced by the melody-generation system of FIG. 3 can be increased by configuring the system so that, for certain portions of the melody, the requirement for a Markovian sequence is relaxed. In particular, certain portions of the generated melody may be produced by implementing a formal transformation of an earlier portion of the melody. For example, selected phrases in the melody may be generated by formal transforms that include: transposing the preceding (or, more generally, an earlier) musical phrase up (or down) one semi-tone, reversing the pattern of notes in the transformed musical phrase, combining such transpositions and reversals, etc. FIG. 3 illustrates, in broken lines, a transform unit 47 which may be used for computing formal transforms of this type. In general, in this application portions of the melody that correspond to transforms will constitute a relatively small part of the generated sequence.

Operation of the transform unit 47 (in place of the chunk-wise sequence generator 45) to generate the next portion of the sequence can be triggered by user input or automatically by the system, based on some preset criterion for example, implement a transform if there has been no change of chords for a number n of beats of the melody). The sequence data output by the transform unit 47 is supplied to the Markov chain sequence generator 42 so that the candidate sequences generated by the Markov chain generator unit 42 (in respect of a Markovian sequence portion that follows on from a sequence portion corresponding to a transform) can be generated in a manner which follows on appropriately from that non-Markovian sequence portion. The sequence data output by the transform unit 47 is also supplied to the sequence selector 44 so that the sequence selector 44 can compute scalar features for sections of this sequence data also.

The melody-generation system of FIG. 3 is suitable, amongst other things, for real-time musical games and, for example, for use with gesture-based controllers. This system generates melodies that are "high-quality" musically speaking. In particular, the system has been used to produce melodies that mimic stylistic qualities of jazz improvisations (notably bebop improvisations) and have been rated as comparable in quality to those played by a virtuoso jazz improviser. This represents a considerable advance over prior art automatic jazz-melody generation systems which, at best, have produced melodies rated as comparable to those of a college-level musician.

The "generate and test" approach used in the first preferred embodiment of the invention represents a compromise between computational simplicity and completeness of the search. However, this approach does not ensure that the system finds the optimal sequence.

A second preferred embodiment of Markovian-sequence generation method according to the present invention will now be described with reference to FIGS. 4 to 7. The search strategy applied in the second preferred embodiment of the invention is complete and optimal, i.e. it guarantees that the sequence that is found is the best possible given the parameters of the sequence-generation task (i.e. the requirement for a Markovian sequence, and the control criteria/criterion to be satisfied).

According to the second preferred embodiment of the invention, the Markovian-sequence generation task is formulated, for each chunk of the Markovian sequence, as a respective constraint satisfaction problem (CSP) involving finding suitable values for the successive items in this chunk of the overall Markovian sequence to be generated. The successive items in the given chunk constitute the constrained variables of a CSP, and the constraints applicable to these variables are:

- a set of first constraints ensuring that the chunk constitutes a Markovian sequence (and, in order to ensure that the chunk currently being considered forms a Markovian continuation with the preceding one, the last variables of the preceding chunk in the sequence can be set as the first variables of the new chunk to be considered; the values of these carried-over variables will not be changed during solution of the CSP for the current chunk, but their values will be taken into account), and
- a set of one or more second constraints ensuring that the sequence-chunk is suitable to ensure that the control criterion (or criteria) are/is satisfied.

The "first constraints" will sometimes be referred to here as "Markov constraints" in view of the fact that they are constraints that are being imposed on the sequence-chunk in order to ensure that the overall generated sequence portion that includes this chunk has the Markov property. The "second constraints" will sometimes be referred to here as "control constraints" in view of the fact that they are constraints that are being imposed on the sequence-chunk in order to ensure that the generated sequence satisfies the specified control requirements.

It is believed that constraint satisfaction techniques have never before been used for generating a Markovian sequence.

Formulating the sequence-generation task as a CSP has a "cost" in terms of time and processing overhead, instead of the almost zero-cost of conventional variable order Markov generation (basically a random draw at each step), because this CSP formulation entails a search through the space of all possible sequences of length N (the size of the chunk). However, this cost is reduced drastically by the technical means described below.

The skilled person will readily appreciate that numerous different approaches and techniques from the field of constraint satisfaction can be applied to solve the Markovian sequence-generation task when formulated as a set of CSPs applicable to chunks of the sequence in accordance with the second preferred embodiment of the invention.

The solution of the formulated CSP will, in general, involve enumerating different possible combinations of values for the constrained variables (i.e. the items in this sequence-chunk) and, in order to reduce the number of cases to consider, taking the various constraints into consideration in an "active" way so as to reduce the domains of the constrained variables. More particularly, during the enumeration process, a determination is made as to which values in the domains of the constrained variables are compatible with the values that could be assigned to a given constrained variable and also compatible with satisfying the sets of first and second constraints of the CSP. Incompatible items in the domains of the constrained variables are removed. This process, termed "filtering", allows the domains of the constrained variables to be reduced, thus reducing the search space substantially.

The procedure of assigning potential values to the constrained variables and filtering takes time and processing power but it reduces the size of the space to be searched.

Preferably, the Markovian-sequence generators and generation methods according to the second preferred embodiment of the invention formulate the sequence-generation task as a CSP using constraints which have the property of "arc consistency" (which ensures a good balance between the amount of time taken for filtering and the reduction in the size of the search tree) as discussed by Mackworth in "Consistency in Networks of Relations", Artificial Intelligence, 8(1): 99-118 (1977).

The inventors have found that, when formulating the Markovian-sequence-generation task as a CSP using a particular set of first constraints which ensure that the generated sequence is variable-order Markovian, i.e. a set of first constraints which optimizes the degree to which the generated sequence is a tiling between elements of variable length taken from training sequences in a training database, it is possible to define these constraints so that they have arc consistency. The second preferred embodiment of the invention can use a set of first constraints that ensures fixed order Markovian properties, but it has not yet been verified whether the advantageous arc consistency would be maintained.

In systems and methods according to the second preferred embodiment of the present invention, well-known types of constraints that have already been defined and used during formulation and solution of other types of constraint satisfaction problems will generally be suitable for use as the "second constraints" (i.e. the "control constraints" which ensure that the generated sequence matches the set of one or more control requirements). Selection, from a library of known constraints, of a control constraint that is appropriate to a given control requirement will, in general, be a routine matter for the skilled person. This will be appreciated from a consideration of the three examples in the following table:

| Control criterion | Example of an Appropriate Constraint/Method |
|---|---|
| The item at location p in the sequence must be item q | Fix the domain at location p to item q, then apply other constraints keeping this domain fixed |
| The item at the $i^{th}$ location in the sequence-chunk must = the item at the $k^{th}$ location | An "equals" constraint holding on constrained variables $V_i$, and $V_k$. |
| The items at the last 4 locations in the sequence-chunk must be different from one another | An "AllDifferent" constraint holding on the last four constrained variables in the set being considered |

Clearly, it is advantageous to use, as control constraints, constraint types for which efficient filtering procedures have already been developed. However, fortunately, numerous publications describe efficient filtering algorithms for the example constraints/methods listed in the table above, as well as for constraints which enforce arithmetic requirements, cardinality requirements, and most other realistic computable requirements holding on sequenced items.

Moreover the skilled person may well devise new types of constraint that will be suitable for use as control constraints according to the second preferred embodiment of the present invention. Once again, when known (or newly-developed)

constraints are being considered for use as control constraints in systems and methods according to the second embodiment of the present invention, it is advantageous to select a constraint which has the arc consistency property. For the purpose of illustration, but not limitation, an example will be given of a combination of constraint satisfaction techniques that may be applied in order to solve a CSP formulated according to the second preferred embodiment of the invention, so as to generate a chunk of a Markovian sequence whose properties are controlled according to one or more control criteria (including criteria which require some "lookahead" at items later on than the item following on immediately from the sequence generated so far). In the following description of this specific example, details of the definition and handling of the control constraints will be omitted. This is, firstly, because in general the definition and handling of the control constraints correspond to techniques used in conventional constraint satisfaction. Secondly, in the example below, the specific control requirements that are mentioned all are of the first type listed in the table above, and merely require fixing of the domains of particular ones of the constrained variables.

According to the present example, the filtering process follows an "event-based" approach as described, for example, by P. Roy, A. Liret, and F. Pachet in "A Framework for Object-Oriented Constraint Satisfaction Problems" in "Implementing Application Frameworks: Object-Oriented Frameworks at Work" Fayad, M. and Schmidt, D. and Johnson, R., editors, pages 369-402, John Wiley & Sons (1997), or also in the Choco CSP constraint library User Guide http://choco-solver.net/index. php?title=User_guide (2009), together with a so-called "branch and bound" strategy. These two techniques are well-known in the field of combinatorial optimization and so only limited details will be provided here.

According to an event-based approach, filtering will be performed when particular events occur during the enumeration process. The events are typically:

1) A variable has been set a value by the algorithm
2) A value has been removed from the domain of a variable
3) The minimum value has been increased
4) The maximum value has been decreased
5) The domain has been reduced For each constraint, a set of algorithms is defined which describes how to reduce the domains of the constrained variables when each of the predetermined events occurs.

The "branch and bound" strategy consists in defining a "cost function" whose value must be minimized (or optimized) for a given combination of values of the constrained variables. This cost function is itself represented as a constraint. The search process stops when the cost function has reached an optimal value.

Below an example is given of a possible configuration of the set of first constraints (i.e. the constraints which ensure that the generated sequence-chunk is Markovian) for the case where it is desired to produce a variable order Markovian sequence. From his general knowledge, augmented by the teaching here, the skilled person will readily be able to determine alternative configurations, of the first set for constraints, that are suitable for generating a variable order Markovian sequence, as well as alternative configurations, of the first set of constraints, that are suitable for generating fixed order Markovian sequences of different orders.

The present example proposes a set of "Markov" constraints of a general type which ensures that the generated sequence follows the rules of variable-order Markov generation, and of a number and configuration that accurately describe the properties of Markov sequences, as generated by random walk approaches. With this configuration of constraints (described below), the search algorithm generates all the possible sequences that a random walk approach would generate, and maybe more. It may generate more sequences, notably because the variable-order random walk approach favours systematically longer sub-sequences when it can, whereas the CSP formulation may favour a shorter subsequence at one step to make it possible to have a much longer one later in the sequence.

In order to generate a sequence-chunk of length N (i.e. a chunk containing N adjacent items in the sequence) it is desired, in this example, to analyse the set of all possible variable-order Markov sequences that could be present in the sequence. The successive items in the sequence-chunk are treated as N constrained variables $V_1, V_2, \ldots, V_N$, and the domain of each variable $D_i$ is the set of all possible items that might belong to the sequence. The goal of the search process is to assign a unique value to each variable so that the various constraints (defined below) are all satisfied.

In this example it is assumed that the transitions allowed in the sequence to be generated (and their corresponding probabilities) are defined by predetermined training sequences in a "training database". Because this example relates to the case here the generated sequence is a variable order Markovian sequence, variable-length portions of the training sequences define the allowed Markovian sub-sequences that could be generated as part of the sequence to be output.

In theory, the minimum size of a training database would be one sequence that contains two items. However, most practical applications of the system will use a larger number of training sequences and/or longer training sequences.

The content of the training database can be designated DB={$S_1, \ldots, S_p$}, where $S_i$ is one of the training sequences of items. For instance, in a music-generation application, the sequence to be generated, and each training sequence, could be a melody, i.e. a sequence of pitches. For example, one training sequence could be the following portion of Beethoven's "Ode to Joy" in C major:

{E, E, F, G, G, F, E, D, C, C, D, E, E, D}

In fact, in a typical melody-composition system it would generally be appropriate to use a larger training database than a single 15-note melody. Typically, 50 melodies of 30 notes each would be more usual (although, if desired, a larger training database with more branching options could easily be produced by transposing the available sample melodies into all possible musical keys; this would multiply the number of training sequences by 12).

In formal terms, the Markovian property of the sequence to be generated may be stated as follows:

The sequence $V_1, V_2, \ldots, V_N$ is made up of various sub-sequences taken from the DB. These sub-sequences are "tiled" to each other. In this "variable order" case, tiling means that the first element of a subsequence forms a continuation with 1 or more elements of the previous subsequence. The number of elements in the previous subsequence is called the "order" of the continuation. For instance, the following sequence: E D E E F G is made up of tiles borrowed from the training sequence in the initial database, as illustrated in FIG. 4. In FIG. 4, the different orders of the continuations are, respectively, 1 and 2.

In this example, in order to constrain the items in this sequence-chunk so that they implement this variable-order tiling process a set of first constraints is set up on all possible orders (from 2 to a maximum value Order-max), on all successive sliding sub-sequences of the sequence to generate. These first constraints shall be termed "Markov" constraints so as to differentiate them from the second constraints which ensure that the generated sequence-chunk satisfies the control criteria/criterion.

A configuration of Markov constraints suitable to achieve the desired tiling process is illustrated in FIG. 5, which relates to the case where the generated Markovian sequence is variable order insofar as sub-sequences of order 2, 3 or 4 are permitted (i.e. Order-max=4).

In the example illustrated in FIG. 5, it is necessary to check all adjacent pairs, triplets and quadruplets of adjacent items in the sequence so as to determine whether or not they correspond to sub-sequences that are present in the training database. This amounts to checking whether or not the Markov property is respected by the checked groups of adjacent items. This checking process is implemented by defining a respective Markov constraint for each adjacent pair, triplet and quadruplet of adjacent constrained variables in the sequence-chunk.

In FIG. 5 the symbol $C_{12}$ designates the Markov constraint that checks whether or not adjacent constrained variables $V_1$ and $V_2$ correspond to some subsequence of length 2 that is present in the training database (i.e. an allowed sub-sequence); more generally a symbol $C_{i,i+1}$ designates the Markov constraint that checks whether or not adjacent constrained variables $V_i$ and $V_{i+1}$ correspond to some subsequence of length 2 that is present in the training database. In a similar way, the symbol $C_{234}$ designates the Markov constraint that checks whether or not adjacent constrained variables $V_2$, $V_3$ and $V_4$ correspond to a subsequence of length 3 that is present in the training database); more generally a symbol $C_{i,i+1,i+2}$ designates the Markov constraint that checks whether or not adjacent constrained variables $V_i$, $V_{i+1}$ and $V_{i+2}$ correspond to some subsequence of length 3 that is present in the training database. Likewise, symbol $C_{3456}$ designates the Markov constraint that checks whether or not adjacent constrained variables $V_3$, $V_4$, $V_5$ and $V_6$ correspond to a subsequence of length 4 that is present in the training database; and more generally a symbol $C_{i,i+1,i+2,i+3}$ designates the Markov constraint that checks whether or not adjacent constrained variables $V_i$, $V_{i+1}$, $V_{i+2}$ and $V_{i+3}$ correspond to some subsequence of length 4 that is present in the training database.

For simplicity, FIG. 5 only shows Markov constraints applicable for 6 constrained variables (i.e. applicable to the first 6 items in a sequence-chunk being generated). However, it is straightforward to increase or decrease the number of required Markov constraints when there is a larger or smaller number of constrained variables (i.e. a sequence-chunk longer or shorter than 6 items).

The skilled person will understand that, in a case where it is desired to generate a fixed-order Markovian sequence of order 2 it is only necessary to specify Markov constraints $C_{ij}$ which check whether adjacent pairs of items in the sequence correspond to sub-sequences of length 2 in the training database. Likewise, in a case where it is desired to generate a fixed-order Markovian sequence of order 3 it is only necessary to specify Markov constraints $C_{ijk}$ which check whether adjacent triplets of items in the sequence correspond to sub-sequences of length 3 in the training database; and so on.

In the present example, each of the above-mentioned Markov constraints is associated to a Boolean variable (designated here "the jump variable"). This jump variable has value "True" if the corresponding subsequence is legal (i.e. it belongs to the set of training sequences), and false otherwise (in which case there is a violation of Markovian continuity for this particular subsequence and this particular order).

With the above-described number, configuration and type of Markov constraints, it is possible to define a cost function (used by the branch and bound algorithm) in a particularly simple manner. More especially, the cost function may be defined as the sum of all Boolean jump variables (here True=0 and False=1). The branch and bound search process ensures that the "lowest cost" combination of values for the constrained variables is located and selected for output. It can be shown that minimizing the sum of all Boolean jump variables (i.e. the total number of Markov violations) corresponds naturally to a solution with "maximum" tiling between successive sub-sequences, i.e. a solution that could have been generated by a random walk approach.

Implementations that make use of the branch & bound process are not obliged to make use of the above cost function based on a simple sum, other functions can be used. For instance, if it were desired to favour longer sub-sequences, the cost function could be a weighted sum of orders in which higher orders are given higher weights. In this case, the branch & bound process would naturally favour these higher orders.

In order to avoid a costly combinatorial search, it is advantageous to define an efficient filtering procedure for the Markov constraints. Two examples of such efficient filtering procedures will now be described:

The first example filtering procedure consists in employing and combining existing techniques known in the field of constraint satisfaction. In particular, the so-called regular constraint, introduced by G. Pesant in "A regular language membership constraint for finite sequences of variables", LNCS 2004, 32(58):482-495, provides an efficient filtering mechanism for regular languages. These languages are defined by a Deterministic Finite Automata (DFA). In order to use this constraint as a building block in an implementation of the second preferred embodiment of the invention, it is necessary to make two additions:

1) Transform the set of input sequences into such a DFA using any of the available techniques (well-known to the skilled person). For example, a simple (but less efficient) technique would be to consider each occurrence of a symbol in each sequence as a state (this would typically produce a large and costly structure). More efficient automata can be built, e.g. using the Factor Oracle algorithm, as proposed by C. Allauzen, M. Crochemore and M. Raffinot in "Factor Oracle: A New Structure for Pattern Matching" in Proceedings of the 26th Conference on Current Trends in Theory and Practice of informatics on Theory and Practice of informatics (Nov. 27-Dec. 4, 1999), J. Pavelka, G. Tel, and M. Bartosek, Eds, Lecture Notes In Computer Science, vol. 1725. Springer-Verlag, London, 295-310.

2) Introduce the Boolean jump variable (see above) in the filtering procedure. This variable is used to activate/deactivate the regular constraint, during the branch & bound process, as explained above.

The second example filtering procedure consists in directly exploiting the set of input sequences, bypassing the explicit construction of a DFA. According to this approach the Markov constraint can be implemented, as indicated above:

$$\text{Markov}(J, V_1, V_2, \ldots, V_N).$$

This constraint holds on variables $V_1$, $V_N$. It ensures that $J$=true $\Leftrightarrow$ the values of $V_1, \ldots, V_N$ constitute a valid subsequence of length N, i.e. there exists a subsequence of length N somewhere in the training corpus.

Two data structures are introduced in order to filter this constraint properly:
1) An oracle that returns "true" if a given subsequence is legal (or "false" if it is not). Such an oracle can be implemented using various techniques, such as suffix trees (as in the above-mentioned Continuator system of EP 1,274,069, the content of which is incorporated herein by reference), or DFA as mentioned above. Technically this oracle, whatever its implementation, is able to implement the following functions efficiently:
   i) hasSequence(Seq)=>Boolean,
      Returns true if Seq belongs to the training corpus (see propagateSeqVarValueChanged), and
   ii) getCompatibleSequences(order, i, value)
      Returns the list of all sub-sequences of length order, having value at position i
2) A data structure called countMap which is maintained during the filtering process. This data structure is associated to each variable of the sequence. It contains the list of their possible values (their domain), together with a count. This count represents the number of times the value has been seen in the training corpus. For example, given the training corpus defined by: {1, 2, 3, 4, 3, 2, 1}, and given a Markov constraint set on the four first variables, the countMaps for each variable are the following:

$V_1 => \{1(1), 2(1), 3(2), 4(1)\}$ $V_2 => \{2(1), 3(2), 4(1)\}$ $V_3 => \{2(1), 3(2), 4(1)\}$ $V_4 => \{1(1), 2(1), 3(1), 4(1)\}$

The above-mentioned two data structures (the oracle and the countMap) suffice to implement filtering procedures efficiently for a Markov constraint. The filtering procedures can maintain arc-consistency.

The filtering procedures for the Markov constraints may be implemented, according to an event-based approach, as follows. (They all rely on a "valueRemoved" algorithm described below, which exploits the countMap by decreasing the counts when possible. When a count reaches 0, a backtrack is produced, i.e. given that the combination of values currently being considered in the enumeration process cannot lead to a solution that meets the constraints of the problem, the enumeration process moves on to consider a different combination (this triggering of a backtrack when a domain is wiped out is a standard procedure in event-based constraint satisfaction).)

a) When variable $V_i$ has been assigned value x (during the enumeration process) a procedure designated valueChanged(Vi, x) is performed. The goal of this procedure is to maintain arc-consistency for the constraint. This is done by removing values from the domains of the other variables of the constraint, by the following steps:
   1—Collect sub-sequences of length=order having value x at position i compatibleSequences=Oracle.get CompatibleSequences(order, i, x)
   2—Filter out sequences incompatible with the variable's current domains for (Variables $V_j$, j!=i)
      Remove sequences for which the value at position j does not belong to the domain of $V_j$ (i.e. its count is 0)
   3—Collect the resulting domain for each variable $V_j$
      Domain of $V_j$=allPossibleValues at position j in compatibleSequences
b) When variable $V_i$ has had a value removed from its domain (during the enumeration process) a procedure designated valueRemoved($V_i$, x) is performed. The goal of this procedure is to maintain arc-consistency for the constraint. This is done by decreasing the countMap for some values of the domains of the other variables of the constraint, by the following steps:
   1—Collect sub-sequences of length order having value x at position i compatibleSequences=Oracle.get CompatibleSequences(order, i, x)
   2—For each sequence $S_k$ in compatibleSequences
      For all position j!=i
      Decrease the countMap for $V_j$ for the value at position j in sequence $S_k$
c) When the domain of variable $V_i$ has been reduced during the enumeration process, or the minimum value of the domain has increased, or the maximum value of the domain has decreased, these cases are treated as a series of value removals, implemented using the valueRemoved method described above, for each value removed.

In order to test the ability of the above-described example of a Markovian-sequence generation method according to the second preferred embodiment of the invention to generate Markovian sequences having controlled properties, the above-described techniques were applied in a task seeking to generate a variable-order Markovian sequence of 20 musical notes (i.e. pitches) and maximum order 4, with the following additional control criteria holding on items at different locations in the sequence:
   First note is C (i.e. 0)
   Sixth note is D (i.e. 2)
   Last note is C (i.e. 0)
   Mid note (at position 11) is F (i.e. 5)
      and assuming a training database containing the following training sequences (the sequences represent pitches (0=C, 2=D, etc.).
      Ode to Joy (Beethoven):
      {E E F G G F E D C C D E E D D}
         With a Little Help from my Friends (The Beatles):
      {E F G G F E D E F F E F E D D D C E}
         An arpeggio:
      {C E C E G F D C};
The following sequence was generated:
   C E G F E D E C E G F D C E C E G F D C
This melody has 0 Markovian jumps (so it is optimally Markovian); it is made up of sub-sequences from the training database as illustrated in FIG. 6. Moreover, it can be seen from FIG. 6 that the generated Markovian sequence also satisfies the control criteria.

As indicated above, the foregoing example is but one of the numerous possible specific methods available for formulating the task of generating a controllable Markovian sequence as a CSP and applying constraint satisfaction techniques to solve the formulated problem. The foregoing example may be improved in various ways, and alternative techniques may be adopted.

For example, one way in which the above example approach could be improved consists in an optimization of the handling of the jump variables. There is a relation between Markov constraints of order n and Markov constraints of higher order when the higher order constraint "contains" all the variables of the lower order one. In this case, it is needless to filter the higher order constraint, when the lower order constraint is violated (because discontinuity of order n obviously implies a discontinuity for higher orders). Accordingly, one optimization would be to implement a specific "entailment" constraint holding on the various jump constraints of the problem. This type of optimization can further reduce the amount of search needed to find the optimal solution to the formulated CSP.

Figure 7:
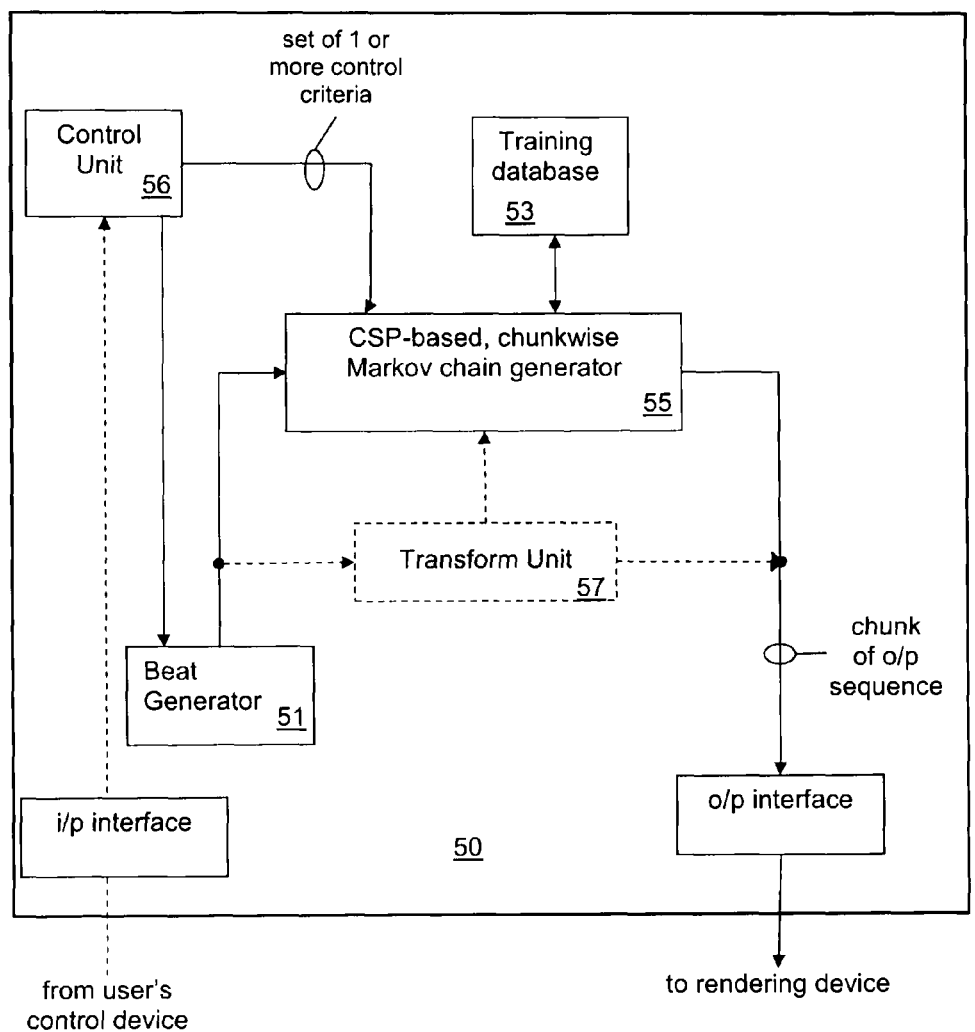
FIG. 7 is a block diagram showing components in a jazz-melody composing system as an example of an application of the second preferred embodiment of the invention.

As one example of the architecture of a sequence generator according to the second preferred embodiment of the invention, FIG. 7 illustrates the main components of a jazz-melody composing system 50 analogous to the system 40 of FIG. 3.

Similarly to the system 40 illustrated in FIG. 3, in the system 50 illustrated in FIG. 7, a beat generator 51 determines the number and type of musical notes that will be used to represent one beat of the jazz melody being composed (e.g. four quarter notes, eight eighth notes, etc.). This determines how many notes will be in a "chunk" of sequence to be generated next. The beat generator 51 informs a CSP-based, chunkwise Markov chain generator 55 of the number and/or type of notes to be included in the next sequence-chunk. A control unit 55 provides the CSP-based, chunkwise Markov chain generator 55 with data identifying the set of one or more control constraints which need to be respected by the sequence.

As in the system 40 of FIG. 3, the control criteria can be built into the system, provided by a user in advance and/or input in real-time; the control criteria may be input via an interface from a user control device. Similarly, the sequence data produced by the jazz-composing system 50 may be output in any desired form, for example to a rendering device, via an output interface.

The CSP-based, chunkwise Markov chain generator 55 is configured according to the second preferred embodiment of the invention to formulate the sequence-chunk generation task as a CSP involving a number of constrained variables equal to the number of notes fixed for this chunk by the beat generator 51, a first set of Markov constraints designed to ensure the sequence is Markovian and a second set of control constraints designed to ensure that the generated sequence satisfies the set of control criteria identified by the control unit 55. The CSP-based, chunkwise Markov chain generator 55 has access to a training database 53 (which may be held in a storage device that is internal or external to the jazz-melody composing system 50).

It should be understood that the control criteria supplied to the CSP-based, chunkwise Markov chain generator 55 by the control unit 56 may specify requirements that hold only on items in the current chunk to be generated, or requirements that, in addition to holding on one or more items in the current chunk to be generated, also hold on one or more items that are in chunks of the sequence that have already been generated and output by the CSP-based, chunkwise Markov chain generator 55. The latter case will typically apply when the user wishes to control a sequence in a relative manner (e.g. the user's control indicates that he wishes the jazz melody to become "more syncopated").

As in the system 40 of FIG. 3, in the system 50 of FIG. 7, a transform unit 57 can optionally be provided so as to generate non-Markovian chunks of the output sequence.

It should be mentioned that in those alternative implementations of the second preferred embodiment where the probabilities of transitions within the Markovian sequence are governed by explicit rules, rather than by the transitions observed in a training database, the training database 55 illustrated in FIG. 7 is not provided. Instead the CSP-based, chunkwise Markov chain generator 55 is provided with the appropriate transition probability data (e.g. from a look-up table or computation unit) or is configured so as to compute the appropriate probability data itself.

Moreover, in such alternative implementations where the probabilities of transitions within the Markovian sequence are governed by explicit rules, the constraint formulation problem can generally be formulated using "fixed order" Markov constraints (i.e. constraints which ensure that the generated sequence-chunk is a fixed order Markovian sequence and follows on from the "sequence generated so far" according to fixed order Markov rules). In "fixed order" cases, there is little advantage in using a branch and bound strategy in solving the CSP, in view of the computational burden involved in that approach.

The above-described Markovian-sequence generation methods will typically be implemented using appropriately-programmed general purpose computing equipment. In such a case, the input and output interfaces shown in FIGS. 2 and 3 are typically implemented using conventional interfaces of general purpose computing equipment. Considering the interactive system architecture 10 illustrated in FIG. 2, the control unit 13 and chunkwise Markovian sequence generator 15 are typically implemented using a suitably-programmed processing unit within a general purpose computer. This is also the case for the beat generator 41, chunkwise Markov-chain generator unit 45, control unit 46, and transform unit 47 in the example melody-generating system 40 of FIG. 3. Moreover the division of functions between the foregoing components in FIGS. 2 and 3 is made for ease of understanding and not by way of limitation; different distributions of these functions are possible and, when a programmed processing unit is used to implement these components, it may not be possible to identify distinct functional modules or program sub-routines which perform the respective functions that have been ascribed to these components.

The skilled person will readily understand, without detailed explanation here, the variety of physical processing components and programming that could be used in order to implement the described methods. In particular, the present invention is not limited to any specific physical implementation.

Although a wide variety of different physical implementations are possible for the controllable Markovian-sequence generators of the present invention, in general each generator will include a selection unit which selects the items for different locations of the generated sequence. The selection unit will include:

a probability-determining unit adapted to provide probability data defining the probability that a given candidate item will follow on in the sequence from a determined sub-sequence of one or more preceding items in said sequence, the probability data will often be provided in the form of a training database but it can be provided in other ways, for example as a look-up table, as a set of rules governing how probabilities may be calculated, etc.; it is not essential for the probability data to be held in the sequence generator itself—although that is advantageous—the probability data could be located in a separate storage device and fetched when needed, over a communications link, by the probability-determining unit (according to the first and second embodiments of the invention—as well as in a standard random walk approach—this probability determining unit may be implemented as an oracle); and a Markov-chain management unit (according to the first preferred embodiment of the invention this Markov-chain management unit explicitly generates possible Markovian sequences that could follow on from the sequence generated so far; according to the second preferred embodiment of the invention the Markov-chain management unit applies Markov constraints during solution of the CSP).

The present invention has been described in terms of the features of certain preferred embodiments and example implementations thereof. However, the skilled person will readily understand that numerous variations and developments can be made in the specific details of the above-described embodiments and implementations.

For example, the detailed examples described above relate to the generation of Markovian sequences of musical notes. However, as indicated above, the techniques and devices of the present invention may be applied very widely in applications of various different types, not limited to the case where the generated sequence corresponds to music items.

Also, the description above details the inputting devices and rendering devices that may be used for real-time input and output in an interactive Markovian-sequence-generation system. However, it is to be understood that inputting devices and rendering devices of the same types as those mentioned above may be used for input of control criteria and output of sequence data other than on a real time basis.

Other embodiments of the present invention, besides the example illustrated in FIG. 3, can be configured to allow selected portions of the generated sequence to be non-Markovian. Moreover, it is to be understood that, in such "mixed-sequence" generators, the size of the Markovian and non-Markovian portions can be different from or the same as each other, as well as being different from or the same as the chunk size used by the Markovian sequence generator.

For example, in systems and methods according to the second preferred embodiment of the invention, a CSP formulation and constraint satisfaction techniques would be applied only for portions of the overall sequence that are desired to be Markovian. Moreover, in a sequence generator according to the second preferred embodiment of the invention, when the current sequence-chunk being generated corresponds to a Markovian sequence-chunk following on immediately after a non-Markovian portion of the sequence, the Markov constraints applied during generation of this current sequence-chunk may be adapted so as not to require the current sequence-chunk to be a Markovian continuation of the preceding, non-Markovian sequence portion.

Furthermore, in a case where the generated sequence has Markovian and at least one non-Markovian portion, it is not essential for the non-Markovian portion(s) of the sequence to be generated by transformation of an earlier section of the sequence as discussed in relation to FIG. 3; sequence generators and generation methods embodying the present invention may be configured to use substantially any sequence-generation process (random generation, algorithmic generation, etc.) of the designer's choice to generate the non-Markovian portion(s) of the sequence. The method used to generate the non-Markovian portion(s) of the sequence may be a method that is influenced by user action.

The preferred embodiments of the invention have been described in terms of systems and methods which generate sequences of elements whose domains cater for variation in one property (or dimension) of the elements in question. For example, the sequenced elements may be musical notes which can have different pitch and the sequence generator selects the pitch for each note in a sequence. However, it is to be understood that the invention is of wider application, that is, the invention may be implemented so as to enable the elements in the sequence to have variation in more than one of their properties. Considering again the example of sequencing musical notes, embodiments of the invention can be adapted to allow variation, say, the pitch and duration of the notes in the sequence. One simple technique for enabling this, mentioned here by way of illustration and not limitation, consists in using multiple instances of the method/system described above, working in parallel; each instance producing a different sequence in which a respective dimension (property) of the sequenced elements can vary. The output sequence is then assembled from elements of the different sequences: the pitches of the notes in the output sequence are taken from the "pitch generator", the durations are taken from the durations selected by the "duration generator", and so on.

The invention claimed is:

1. A Markov-sequence generator adapted to generate and output data defining a sequence of items, at least one sub-sequence of said sequence having a Markov property, the Markovian-sequence generator comprising: at least one hardware processor; an inputting unit, implemented by the at least one hardware processor, adapted to receive a control input defining a set of one or more control criteria specifying desired properties of the sequence, which is to be generated; and a selection unit, implemented by the at least one hardware processor, adapted, for each location in the Markovian sub-sequence, to select an item for inclusion in the Markovian sub-sequence at said location, the selection unit comprising: a probability-determining unit adapted to provide probability data defining the probability that a given candidate item will follow in the sequence from a determined sub-sequence of one or more preceding items in said sequence, the probability-determining unit being configured to access a training database to obtain said probability data, said training database storing one or more predetermined training sequences and the probability data being defined by said predetermined training sequences; a Markov-chain management unit adapted to control the selection of items such that the given candidate item in the Markovian sub-sequence follows from the determined subsequence according to the probability defined by said probability data; and an outputting unit adapted to output finalized data indicative of selected items as said Markovian sub-sequence, wherein the selection unit is adapted to search the one or more predetermined training sequences for one or more predetermined training sequences having the Markovian property that include said item at said given location and that match the set of one or more control criteria defining a computable requirement satisfied by at least one item in the one or more predetermined training sequences having the Markovian property located at a location in the sequence subsequent to, and not immediately adjacent to the location for which finalized data has been output by the selection unit.

2. The Markov-sequence generator according to claim 1, wherein the selection unit is adapted to make a groupwise selection of items for inclusion in the sequence at a corresponding series of adjacent locations, each group comprising two or more items, and to output a chunk of finalized data defining the groupwise selection of items.

3. The Markov-sequence generator according to claim 2, wherein the selection unit further comprises a storage unit adapted to hold interim data defining provisional assignments of items to locations in the sequence and the selection unit is adapted to make a final assignment of items to said series of adjacent locations and to output to the outputting unit the chunk of finalized data, which defines said final assignment.

4. The Markov-sequence generator according to claim 1, wherein the Markov-chain management unit includes a Markov-chain generator arranged to generate a plurality of alternative Markov chains and the selection unit comprises a chunk-selection unit adapted to select from among said plurality of alternative Markov chains a Markov chain that satisfies said control criteria defining the computable requirement.

5. The Markov-sequence generator according to claim 1, wherein each chunk of the Markovian sub-sequence is generated as a respective constraint satisfaction problem in which constrained variables are adjacent items in said chunk, and constraint satisfaction techniques are applied to determine the items to be selected for inclusion at locations in said chunk.

6. The Markov-sequence generator according to claim 1, further comprising: a transform unit adapted to generate a non-Markovian portion of the sequence by executing a formal transform of another portion of the sequence.

7. The Markov-sequence generator according to claim 1, wherein: the outputting unit is configured to render the sequence in a form perceptible to a user.

8. An interactive Markov-sequence generating system comprising a Markov-sequence generator according to one of claims 1 through 7, wherein the inputting unit is configured to receive said control input in real-time from an inputting device, responsive to user input, and the selection unit is adapted to generate chunks of the sequence in real-time.

9. The interactive Markov-sequence generating system according to claim 8, wherein the inputting device generates said control input based on user gestures.

10. A Markov-sequence generation method adapted to generate and output data defining a sequence of items, at least one sub-sequence of said sequence having a Markov property, the method comprising the steps of: receiving a control input defining a set of one or more control criteria specifying desired properties of the sequence, which is to be generated; for each location in the Markovian sub-sequence, selecting an item for inclusion in the Markovian sub-sequence at said location, the selecting step comprising the sub-steps of: determining probability data defining the probability that a given candidate item will follow in the sequence from a determined sub-sequence of one or more preceding items in said sequence, the probability-determining step comprising accessing a training database to obtain said probability data, said training database storing one or more predetermined training sequences and the probability data being defined by said predetermined training sequences, controlling the selection of items such that the given candidate item in the Markovian sub-sequence follows from the determined sub-sequence according to the probability defined by said probability data; and outputting finalized data indicative of selected items as said Markovian sub-sequence, wherein the selection step further includes searching the one or more predetermined training sequences for one or more predetermined training sequences having the Markovian property that include said item at said given location and that match the set of one or more control criteria defining a computable requirement satisfied by at least one item in the one or more predetermined training sequences having the Markovian property located at a location in the sequence subsequent to, and not immediately adjacent to the location for which finalized data has been output by the selecting step.

* * * * *